US011579489B2

(12) United States Patent
Jang et al.

(10) Patent No.: US 11,579,489 B2
(45) Date of Patent: Feb. 14, 2023

(54) DISPLAY APPARATUS

(71) Applicant: SAMSUNG ELECTRONICS CO., LTD., Suwon-si (KR)

(72) Inventors: Naewon Jang, Suwon-si (KR); Daeyoung Kim, Suwon-si (KR); Byoungjin Cho, Suwon-si (KR); Kilhong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/198,857

(22) Filed: Mar. 11, 2021

(65) Prior Publication Data

US 2021/0286215 A1 Sep. 16, 2021

Related U.S. Application Data

(60) Provisional application No. 62/989,319, filed on Mar. 13, 2020.

(30) Foreign Application Priority Data

May 13, 2020 (KR) .................. 10-2020-0057157
Feb. 9, 2021 (KR) .................. 10-2021-0018048

(51) Int. Cl.
*G02F 1/13357* (2006.01)
*G02F 1/1335* (2006.01)

(52) U.S. Cl.
CPC .. *G02F 1/133608* (2013.01); *G02F 1/133607* (2021.01)

(58) Field of Classification Search
None
See application file for complete search history.

(56) References Cited

U.S. PATENT DOCUMENTS

| 2001/0030859 | A1* | 10/2001 | Fukuyoshi | ........... G02B 6/0081 362/629 |
| 2007/0236939 | A1* | 10/2007 | Ouderkirk | ........... G02B 6/0053 362/339 |
| 2008/0002256 | A1* | 1/2008 | Sasagawa | ........... G02B 5/0226 359/487.03 |

(Continued)

FOREIGN PATENT DOCUMENTS

| CN | 105301826 A | * 2/2016 | ............... G02B 1/10 |
| JP | 2009-109873 A | 5/2009 | |

(Continued)

OTHER PUBLICATIONS

International Search Report (PCT/ISA/210) issued by the International Searching Authority in International Application No. PCT/KR2021/002987, dated Jun. 25, 2021.

(Continued)

*Primary Examiner* — Phu Vu
(74) *Attorney, Agent, or Firm* — Sughrue Mion, PLLC

(57) ABSTRACT

A display apparatus includes a liquid crystal panel, a light source configured to provide light to the liquid crystal panel, and an optical member disposed between the liquid crystal panel and the light source. The optical member includes a diffuser sheet that is configured to diffuse the light from the light source, and a deformation preventing layer including a first material having a lower expansion or contraction rate than the diffuser sheet.

20 Claims, 9 Drawing Sheets

(56) References Cited

U.S. PATENT DOCUMENTS

2020/0292881 A1\* 9/2020 Tsai ................... G02B 5/0242
2021/0003767 A1   1/2021 Namikawa et al.

FOREIGN PATENT DOCUMENTS

| JP | 2019-53093 A | 4/2019 |
|----|----|----|
| KR | 10-2008-0060406 A | 7/2008 |
| KR | 10-2018-0111092 A | 10/2018 |
| KR | 10-2019-0114872 A | 10/2019 |
| KR | 102087594 B1 | 3/2020 |
| KR | 102090163 B1 | 3/2020 |
| KR | 102119583 B1 | 6/2020 |

OTHER PUBLICATIONS

Communication dated Sep. 19, 2022 issued by the European Patent Office in application No. 21767705.3.

\* cited by examiner

DISPLAY APPARATUS

CROSS-REFERENCE TO THE RELATED APPLICATIONS

This application is based on and claims priority under 35 U.S.C. 119 to Korean Patent Applications No. 10-2020-0057157, filed on May 13, 2020, and No. 10-2021-0018048, filed on Feb. 9, 2021, in the Korean Intellectual Property Office, which claims the benefit of U.S. Patent Application No. 62/989,319 filed on Mar. 13, 2020 in the U.S. Patent Office, the disclosures of which are herein incorporated by reference in their entireties.

BACKGROUND

1. Field

Embodiments of the present disclosure relate to a display apparatus, and more particularly, to a display apparatus including an improved optical structure.

2. Description of Related Art

A display apparatus is a type of output device that visually displays data information, such as characters or figures, and images and the display apparatus includes a television, various monitors, and various portable terminals (for example, laptop computers, tablet PCs, and smart phones).

The display apparatus is classified into a light-emitting type, such as an organic light emitting diode (OLED), that uses a display panel that emits light by itself, and a light-receiving type panel, such as a liquid crystal display (LCD), that uses a display that does not emit light by itself and needs to receive light from a backlight unit.

The backlight unit may include a light source, such as a Cold Cathode Fluorescent Lamp (CCFL), an External Electrode Fluorescent Lamp (EEFL), and a Light Emitting Diode (LED), and various optical subsidiary materials.

According to the position of the light source, the backlight unit may be classified into a direct type in which the light source is disposed at the rear of the display panel and an edge type in which the light source is disposed at the side of the display panel.

SUMMARY

Therefore, it is an aspect of embodiments of the disclosure to provide a display apparatus capable of reducing a width of a bezel.

It is another aspect of embodiments of the disclosure to provide a display apparatus having an improved productivity.

It is another aspect of embodiments of the disclosure to provide a display apparatus having a slim size.

It is another aspect of embodiments of the disclosure to provide a display apparatus capable of securing rigidity.

It is another aspect of embodiments of the disclosure to provide a display apparatus having an improved contrast ratio.

It is another aspect of embodiments of the disclosure to provide a display apparatus capable of increasing a recycling efficiency of light emitted from a quantum dot sheet.

Additional aspects of embodiments of the disclosure will be set forth in part in the description which follows and, in part, will be understood from the description, or may be learned by practice of the disclosure.

According to one or more embodiments, a display apparatus may be provided. The display apparatus includes: a liquid crystal panel; a light source configured to provide light to the liquid crystal panel; and an optical member disposed between the liquid crystal panel and the light source, wherein the optical member includes: a diffuser sheet that is configured to diffuse the light from the light source; and a deformation preventing layer including a first material having a lower expansion or contraction rate than the diffuser sheet.

According to an embodiment, the optical member further includes a quantum dot sheet disposed on a first side of the deformation preventing layer that is opposite to a second side of the deformation preventing layer on which the diffuser sheet is disposed.

According to an embodiment, the optical member further includes a prism sheet disposed on a first side of the quantum dot sheet that is opposite to a second side of the quantum dot sheet on which the deformation preventing layer is disposed, and the quantum dot sheet includes a quantum dot layer and an aft layer, the air layer formed on a side of the quantum dot layer that faces the prism sheet.

According to an embodiment, the first material of the deformation preventing layer has a lower coefficient of thermal expansion than the diffuser sheet and the quantum dot sheet, or the deformation preventing layer further includes a second material having a lower coefficient of thermal expansion than the diffuser sheet and the quantum dot sheet.

According to an embodiment, the deformation preventing layer is disposed in front of the diffuser sheet, and the quantum dot sheet s disposed in front of the deformation preventing layer.

According to an embodiment, the optical member further includes a Dual Brightness Enhancement Film (DBEF) that is configured to transmit a portion of the light passing therethrough and to reflect another portion of the light passing therethrough; and a condensing prism pattern formed on a side of the DBEF that faces the liquid crystal panel.

According to an embodiment, a cross section of the condensing prism pattern has an apex angle that is an obtuse angle.

According to an embodiment, the optical member is formed integrally.

According to an embodiment, the deformation preventing layer includes a glass.

According to an embodiment, the diffuser sheet includes: a diffusion bead that is configured to diffuse incident light; and a diffusion prism pattern that is configured to change a path of light that passed through the diffusion bead.

According to an embodiment, the first material of the deformation preventing layer has a higher light transmittance than the diffuser sheet, or the deformation preventing layer includes a second material having a higher light transmittance than the diffuser sheet.

According to an embodiment, the first material of the deformation preventing layer has a lower light absorption rate than the diffuser sheet, or the deformation preventing layer further includes a second material having a lower light absorption rate than the diffuser sheet.

According to an embodiment, the diffuser sheet includes: a diffusion bead that is configured to diffuse incident light; and a diffusion pattern that is configured to shield or diffuse light that passed through the diffusion bead.

According to an embodiment, the optical member further includes: a Dual Brightness Enhancement Film (DBEF) that is configured to transmit a portion of the light passing therethrough and to reflect another portion of the light passing therethrough; and a protective bead formed on a side of the DBEF that faces the liquid crystal panel.

According to an embodiment, the display apparatus further includes: a prism sheet disposed between the quantum dot sheet and the DBEF, wherein the prism sheet includes: a first prism pattern extending in a first direction; and a second prism pattern extending in a second direction perpendicular to the first direction.

According to one or more embodiments, a display apparatus is provided. The display apparatus includes: a liquid crystal panel; a light source configured to provide light to the liquid crystal panel; and an optical member disposed between the liquid crystal panel and the light source, wherein the optical member includes: a diffuser sheet that is configured to diffuse the light from the light source; a quantum dot sheet that is configured to convert the light that is diffused by the diffuser sheet: a deformation preventing layer disposed between the diffuser sheet and the quantum dot sheet and including a first material having a lower coefficient of thermal expansion than the diffuser sheet or the quantum dot sheet; a Dual Brightness Enhancement Film (DBEF) disposed in front of the deformation preventing layer and provided to transmit a portion of the light passing therethrough and to reflect another portion of the light passing therethrough; and a condensing prism pattern formed on a side of the DBEF that faces the liquid crystal panel.

According to an embodiment, the optical member further includes a prism sheet disposed between the quantum dot sheet and the DBEF, and an air layer s formed between the quantum dot sheet and the prism sheet.

According to an embodiment, the first material of the deformation preventing layer has a higher light transmittance and a lower light absorption than the diffuser sheet and the quantum dot sheet, or the deformation preventing layer further includes a second material having a higher light transmittance and a lower light absorption than the diffuser sheet and the quantum dot sheet.

According to an embodiment, the diffuser sheet includes: a diffusion bead that is configured to diffuse incident light; and a diffusion prism pattern that is configured to change a path of light that passed through the diffusion bead.

According to an embodiment, the optical member is formed integrally.

According to one or more embodiments, an optical member for a display apparatus is provided. The optical member includes: a diffuser sheet that is configured to diffuse light from a light source: a quantum dot sheet that is configured to convert the light that is diffused by the diffuser sheet; a deformation preventing layer disposed between the diffuser sheet and the quantum dot sheet and including a first material having a lower coefficient of thermal expansion than the diffuser sheet or the quantum dot sheet; a Dual Brightness Enhancement Film (DBEF) disposed in front of the deformation preventing layer and provided to transmit a portion of the light passing therethrough and to reflect another portion of the light passing therethrough; and a condensing prism pattern formed on a side of the DBEF that faces away from the diffuser sheet.

According to an embodiment, the optical member further includes a prism sheet disposed between the quantum dot sheet and the DBEF, and an air layer is formed between the quantum dot sheet and the prism sheet.

According to an embodiment, the first material of the deformation preventing layer has a higher light transmittance and a lower light absorption than the diffuser sheet and the quantum dot sheet, or the deformation preventing layer further includes a second material having a higher light transmittance and a lower light absorption than the diffuser sheet and the quantum dot sheet.

BRIEF DESCRIPTION OF THE DRAWINGS

These and/or other aspects of embodiments of the disclosure will become apparent and more readily appreciated from the following description of embodiments, taken in conjunction with the accompanying drawings of which.

DETAILED DESCRIPTION

Figure 1:
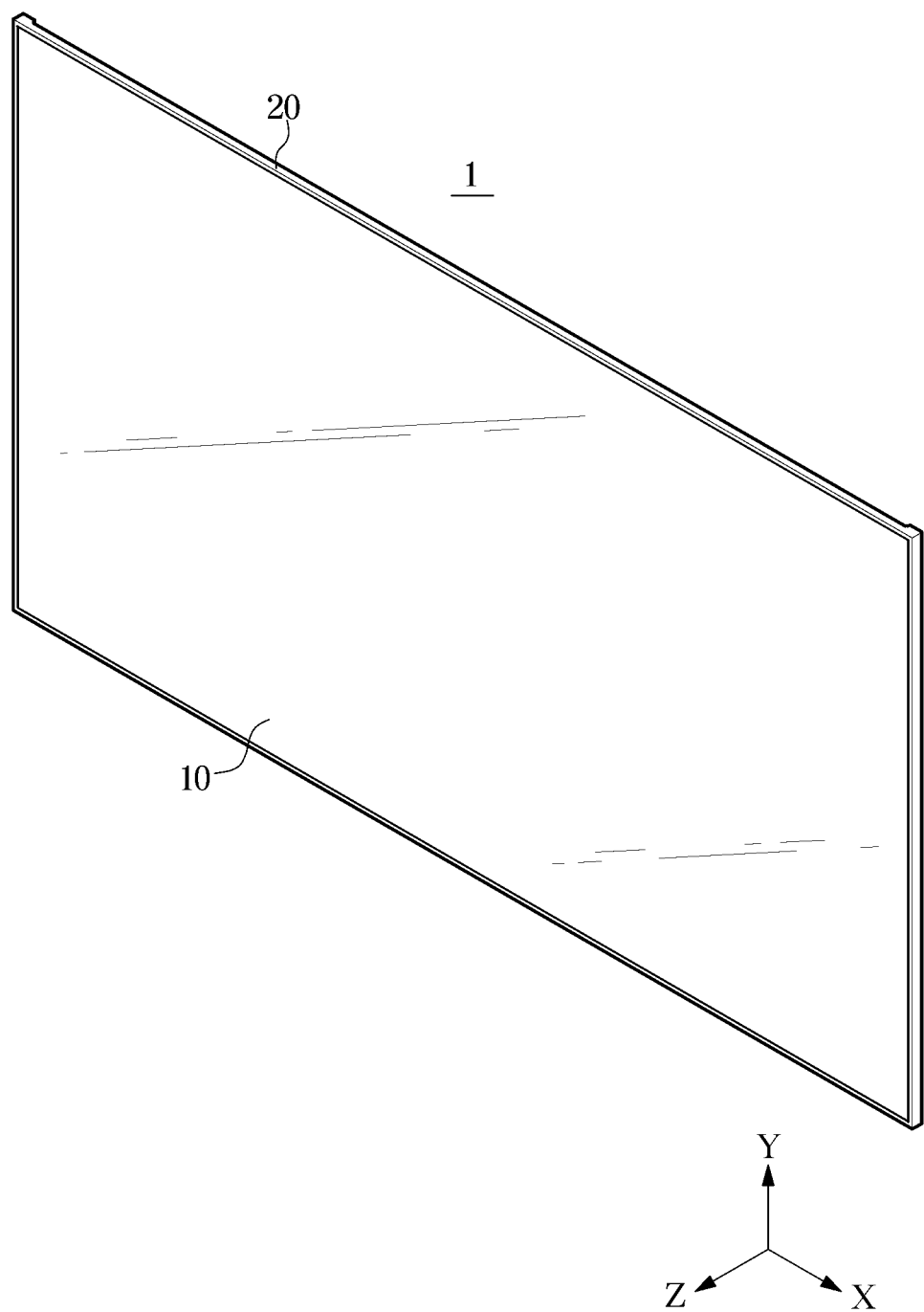
FIG. 1 is a perspective view illustrating an appearance of a display apparatus according to an embodiment of the disclosure.

Embodiments described in the disclosure and configurations shown in the drawings are merely examples of the embodiments of the disclosure, and may be modified in various different ways at the time of filing of the present application.

The singular forms "a," "an", and "the" are intended to include the plural forms as well, unless the context clearly indicates otherwise. In the drawings, it may be exaggerated for clear explanation of the shape and size of elements.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

Directions of "forward" and "rear" will be referred to throughout the description based on the directions shown in FIG. 1 of the accompanying drawings. In FIG. 1, X-axis, Y-axis, and Z-axis directions that are perpendicular to each other are indicated, the X-axis direction represents a direction of a long side 11 (refer to FIG. 2) of a liquid crystal panel 10, the Y-axis direction represents a direction of a short side 12 (refer to FIG. 2) of the liquid crystal panel 10, and the Z-axis direction represents a front and rear direction.

Figure 2:
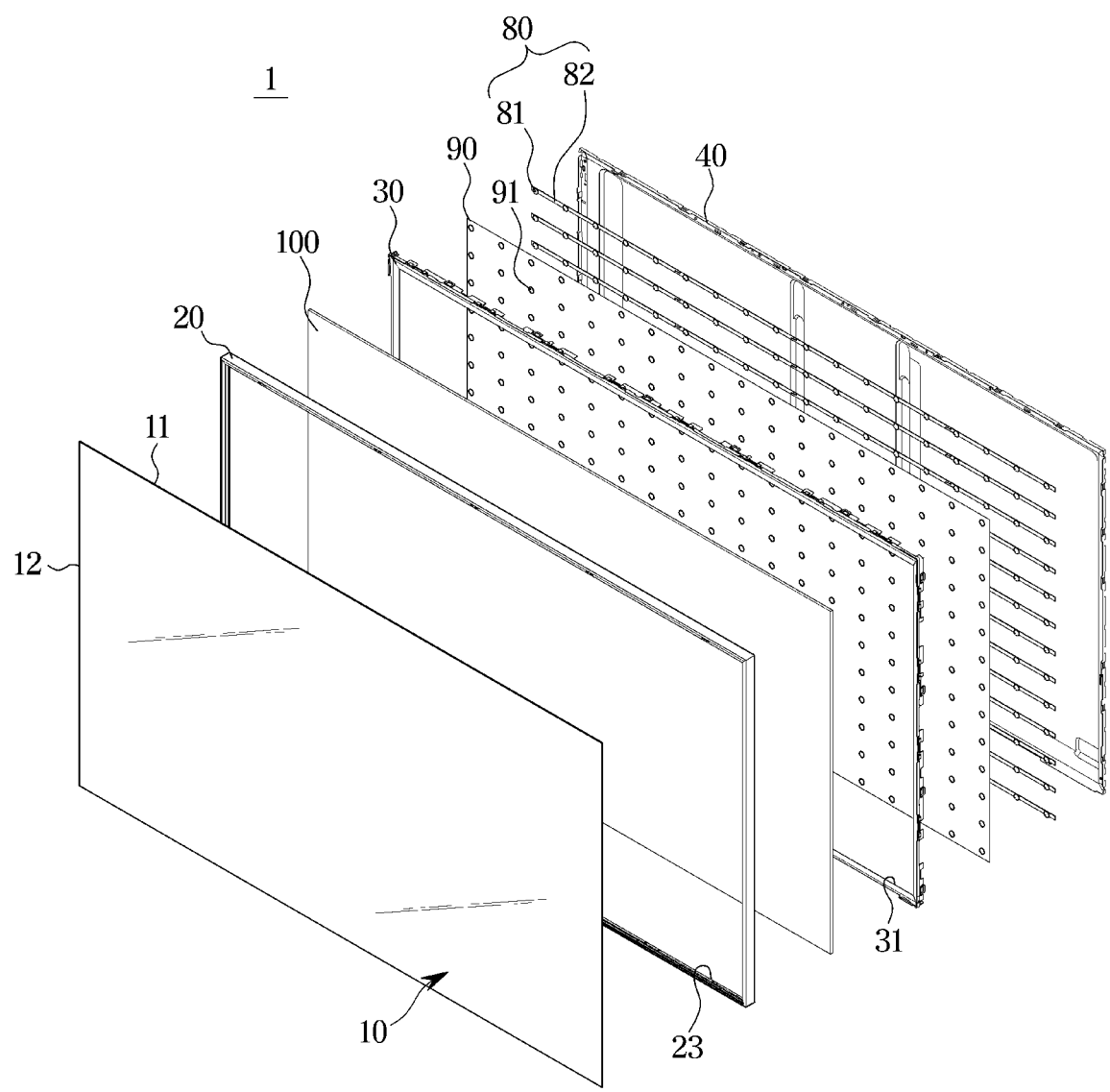
FIG. 2 is an exploded view illustrating main components of the display apparatus shown in FIG. 1.

Embodiments of the disclosure will be described more fully hereinafter with reference to the accompanying drawings FIG. 1 is a perspective view illustrating an appearance of a display apparatus according to an embodiment of the disclosure. FIG. 2 is an exploded view illustrating main components of the display apparatus shown in FIG. 1.

Hereinafter the display apparatus according to an embodiment of the disclosure will be described with reference to FIGS. 1 and 2.

The display apparatus 1 may include a liquid crystal panel 10 provided to display an image, a backlight unit disposed behind the liquid crystal panel 10 to provide light to the liquid crystal panel 10, and a chassis assembly provided to support the backlight unit and the liquid crystal panel 10.

The chassis assembly may include a rear chassis 40 provided to support the backlight unit, a front chassis 20 provided in front of the rear chassis 40 to support the liquid crystal panel 10, and a middle mold 30 coupled between the front chassis 20 and the rear chassis 40. The chassis assembly may accommodate the liquid crystal panel 10.

The liquid crystal panel 10 may include a thin film transistor substrate in which a thin film transistor is formed in a matrix form, a color filter substrate combined with the thin film transistor substrate in parallel, and a liquid crystal injected between the thin film transistor substrate and the color filter substrate and provided to have an optical property that is variable according to a change in voltage and temperature.

The backlight unit may be disposed behind the liquid crystal panel 10 to emit light toward the liquid crystal panel 10. The backlight unit may include a light source device 80 including a plurality of light sources 81 and a Printed Circuit Board (PCB) 82 on which the plurality of light sources 81 is mounted, and optical members disposed on a travel path of light emitted from the plurality of light sources 81. A plurality of the light source device 80 may be provided to be spaced apart from each other.

The plurality of light sources 81 may be mounted in a line on the PCB 82. A driving power line for supplying driving power to the light sources 81 may be formed on the PCB 82 and may be connected to a signal cable (not shown) and a backlight driving circuit (not shown). The PCB 82 may be housed in the chassis assembly.

The display apparatus 1 may include a reflector sheet 90 provided to reflect light so as to prevent loss of light. The reflector sheet 90 may reflect light emitted from the light sources 81 or light, which is emitted from an optical member 100 to the rear side, to the optical member 100. The reflector sheet 90 may be disposed in front of the PCB 82. The reflector sheet 90 may be in close contact with the front of the PCB 82. A through hole 91 may be formed in the reflector sheet 90 to allow at least one of the light sources 81 to pass through.

The rear chassis 40 is disposed behind the backlight unit. The rear chassis 40 may have a plate shape in which an edge portion is bent forward. The backlight unit may be housed between the rear chassis 40 and the front chassis 20.

The rear chassis 40 may dissipate heat generated from a heating element, such as the light sources 81, to the outside. For this, the rear chassis 40 may be formed of various metal materials, such as aluminum and stainless use steel (SUS), or plastic materials, such as acrylonitrile butadiene and styrene (ABS).

The front chassis 20 may have a frame shape including an opening 23 to provide light of the backlight unit to the liquid crystal panel 10. The front chassis 20 may include a bezel formed to have a predetermined width at an edge portion of the opening 23. The bezel may cover a portion of a front surface of an edge of the optical member 100.

The middle mold 30 may support the optical member 100 and reflect light emitted from the light source device 80 to the optical member 100. The middle mold 30 may maintain a gap between the optical member 100 and the light source device 80. The middle mold 30 may be coupled between the front chassis 20 and the rear chassis 40.

The middle mold 30 may be formed in a frame shape including an opening 31 (FIG. 2). The light source device 80 may be disposed in the opening 31. A material having high reflectivity may be coated on a surface of the middle mold 30. The material having high reflectivity may be coated on an entire surface or a part of the middle mold 30. The whole or part of the middle mold 30 may have a white color to allow light to be reflected well.

The optical member 100 may be disposed on a travel path of light emitted from the light sources 81 to guide a traveling direction of light, to reflect light, to diffuse light, or to improve optical characteristics.

Figure 3:
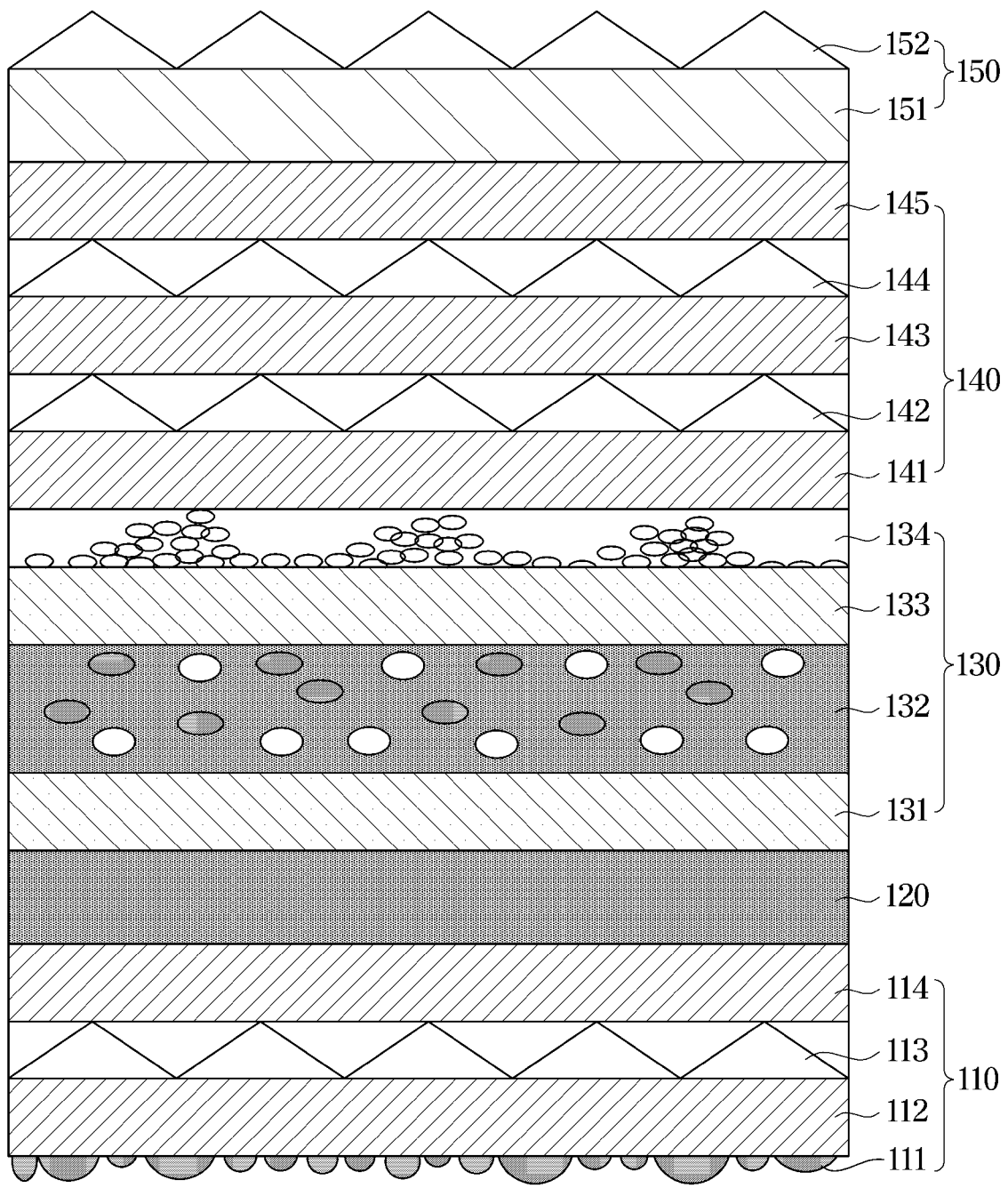
FIG. 3 is a view schematically illustrating a cross section of an optical member shown in FIG. 2.
Figure 4:
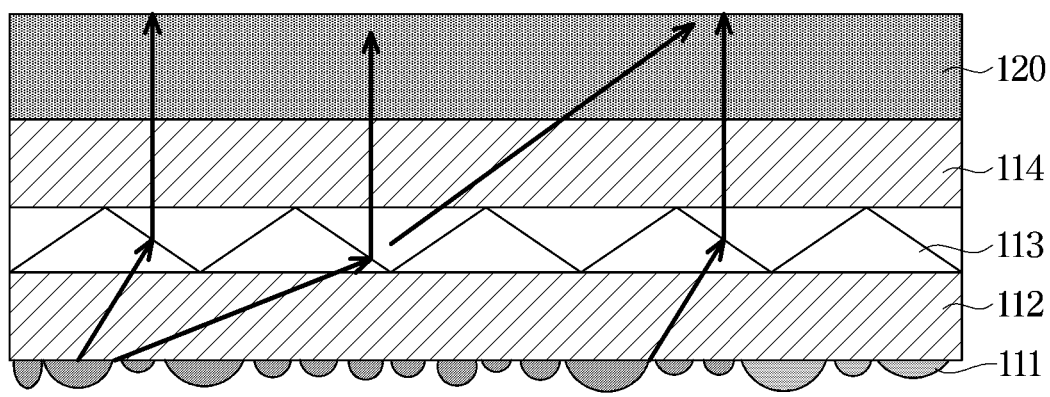
FIG. 4 is a view schematically illustrating light in a diffuser sheet and a deformation preventing layer of the optical member shown in FIG. 3.
Figure 5:
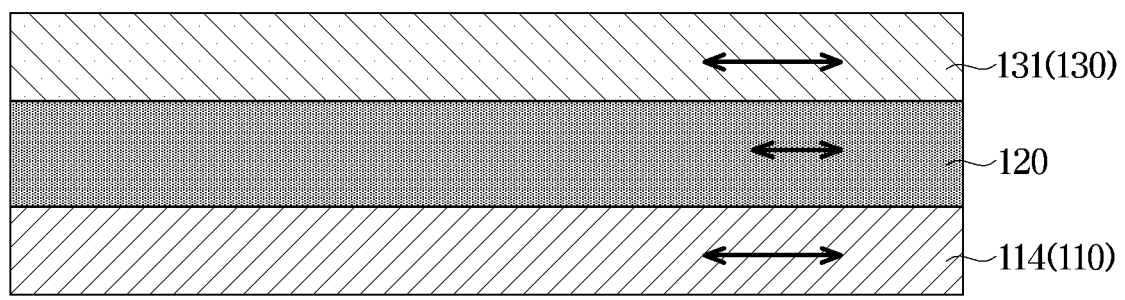
FIG. 5 is a view schematically illustrating an operation of the deformation preventing layer of the optical member shown in FIG. 3.
Figure 6:
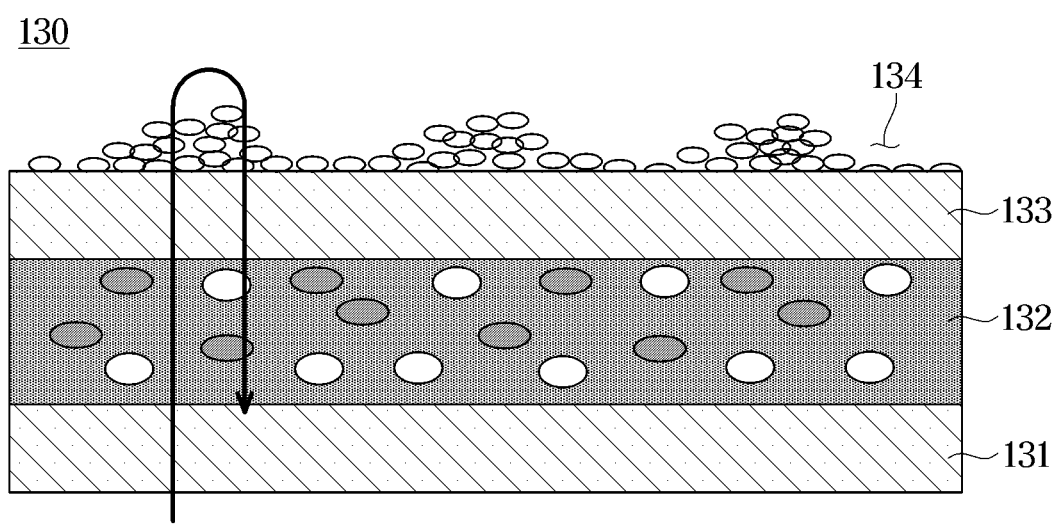
FIG. 6 is a view illustrating an operation of a quantum dot sheet of the optical member shown in FIG. 3.
Figure 7:
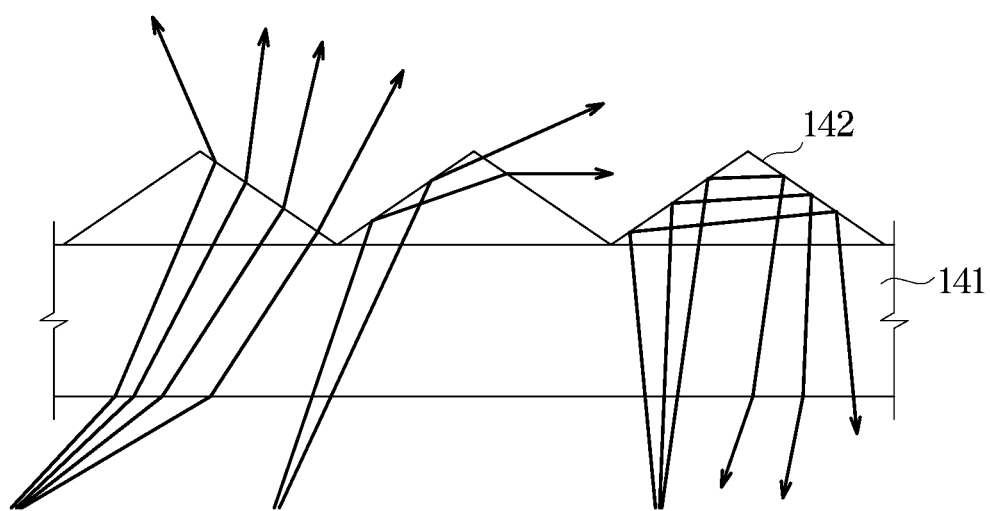
FIG. 7 is a view schematically illustrating light in a prism sheet of the optical member shown in FIG. 3.
Figure 8:
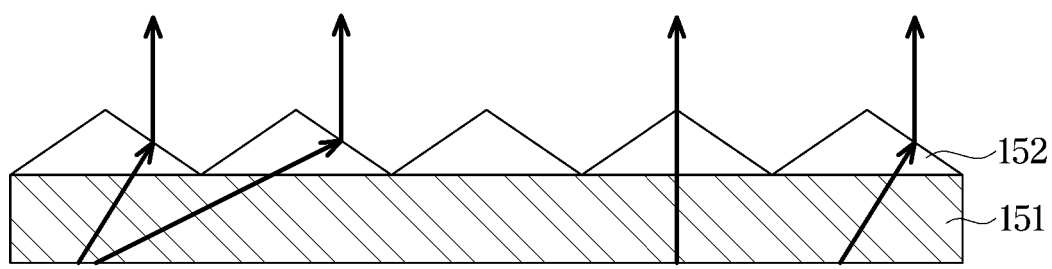
FIG. 8 is a view schematically illustrating light in a reflective polarizing sheet of the optical member shown in FIG. 3.

FIG. 3 is a view schematically illustrating a cross section of an optical member shown in FIG. 2. FIG. 4 is a view schematically illustrating light in a diffuser sheet and a deformation preventing layer of the optical member shown in FIG. 3. FIG. 5 is a view schematically illustrating an operation of the deformation preventing layer of the optical member shown in FIG. 3. FIG. 6 is a view illustrating an operation of a quantum dot sheet of the optical member shown in FIG. 3. FIG. 7 is a view schematically illustrating light in a prism sheet of the optical member shown in FIG. 3. FIG. 8 is a view schematically illustrating light in a reflective polarizing sheet of the optical member shown in FIG. 3.

Referring to FIG. 3, the optical member 100 may include a diffuser sheet 110, a deformation preventing layer 120, a quantum dot sheet 130, a prism sheet 140, and a reflective polarizing sheet 150. The optical member 100 may be formed in such a way that the diffuser sheet 110, the deformation preventing layer 120, the quantum dot sheet 130, the prism sheet 140, and the reflective polarizing sheet 150 are laminated with each other and integrally formed with each other. As the optical member 100 is integrally formed, it is possible to secure rigidity and to improve the quality and productivity. A thickness of the optical member 100 may be reduced by laminating the diffuser sheet 110, the deformation preventing layer 120, the quantum dot sheet 130, the prism sheet 140, and the reflective polarizing sheet 150 with each other.

Referring to FIGS. 3 and 4, the diffuser sheet 110 may be disposed in front of the light sources 81. The diffuser sheet 110 may be disposed in front of the reflector sheet 90. The diffuser sheet 110 may evenly diffuse irregular light generated from the light sources 81. The diffuser sheet 110 may evenly diffuse light incident on an incidence surface and emit the diffused light to an emission surface. The diffuser sheet 110 may include a diffusion bead 111, a first diffusion base layer 112, a diffusion prism pattern 113, and a second diffusion base layer 114.

The diffusion bead 111 may primarily diffuse light incident on the diffuser sheet 110. The diffusion bead 111 may have an irregular shape to evenly mix light.

The first diffusion base layer 112 and the second diffusion base layer 114 may be formed by including a poly ethylene terephthalate (PET) or poly styrene (PS) material.

The diffusion prism pattern 113 may be positioned between the first diffusion base layer 112 and the second diffusion base layer 114. The diffusion prism pattern 113 may secondarily diffuse the light by changing the path of the light that passed through the diffusion bead 111.

The diffusion prism pattern 113 may be a pattern in which ridges and valleys are repeated. The diffusion prism pattern 113 may be formed by arranging a plurality of prisms, which have a substantially triangular cross section, to be adjacent each other. An apex angle of the prism may be formed to be 90° or more. The apex angle of the prism may have an obtuse angle.

Referring to FIGS. 3 and 5, the deformation preventing layer 120 may be disposed in front of the diffuser sheet 110. The deformation preventing layer 120 may be laminated between the diffuser sheet 110 and the quantum dot sheet 130 to minimize deformation of the optical member 100 through adhesion.

The deformation preventing layer 120 may be formed by including a material having a lower coefficient of thermal expansion than the diffuser sheet 110. The deformation preventing layer 120 may be formed by including a material having a lower coefficient of thermal expansion than the second diffusion base layer 114. The deformation preventing layer 120 may be formed by including a material having a lower coefficient of thermal expansion than the quantum dot sheet 130. The deformation preventing layer 120 may be formed by including a material having a lower coefficient of thermal expansion than a first barrier film 131. The deformation preventing layer 120 may be formed by including a material having a relatively lower expansion or contraction rate than the diffuser sheet 110 and/or the quantum dot sheet 130. The deformation preventing layer 120 may be formed by including a glass.

In a conventional manner, in consideration of thermal deformation of the optical member 100, a thickness of the bezel of the front chassis 20 provided to support the edge of the optical member 100 may be needed to be secured at a predetermined size or more. Because the deformation preventing layer 120 of the optical member 100 according to the embodiment of the disclosure has a lower degree of expansion, which is caused by the heat, than the diffuser sheet 110 and/or the quantum dot sheet 130, it is possible to prevent the diffuser sheet 110 and/or the quantum dot sheet 130 from being excessively deformed which may occur if the diffuser sheet 110 and/or the quantum dot sheet 130 is expanded by the heat caused by the driving of the display apparatus 1. The display apparatus 1 according to the embodiment of the disclosure may prevent the diffuser sheet 110 and/or the quantum dot sheet 130 from being excessively deformed by using the deformation preventing layer 120, and thus the display apparatus 1 may further reduce the width of the bezel of the front chassis 20.

The deformation preventing layer 120 may be formed by including a material having a relatively high light transmittance and a relatively low light absorption rate in order to minimize changes in optical characteristics that occurs when light, which is passed through the diffuser sheet 110, passes. The deformation preventing layer 120 may be formed by including a metal-based material.

Referring to FIGS. 3 and 6, the quantum dot sheet 130 may be disposed in front of the deformation preventing layer 120. The quantum dot sheet 130 may improve color reproducibility by changing a wavelength of light. Particularly, a quantum dot, which is a semiconductor crystal having a size of several nanometers, that emits light may be distributed and disposed inside the quantum dot sheet 130. The quantum dots may receive blue light and generate all colors of visible light according to the size of the quantum dot. The smaller the size of the quantum dot, the shorter wavelength light may be generated, and the larger the size of the quantum dot, the longer wavelength light may be generated.

The quantum dot sheet 130 may include the first barrier film 131, a quantum dot layer 132, a second barrier film 133, and an air layer 134.

The quantum dot layer 132 may be sealed by the first barrier film 131 and the second barrier film 133 to block oxygen.

The air layer 134 may be formed by stacking beads from the second barrier film 133. Although not shown, the air layer 134 may be formed by a protrusion extending from the second barrier film 133. The air layer 134 may be formed by a configuration configured to secure a space between the quantum dot sheet 130 and the prism sheet 140. The air layer 134 may be defined as a space formed between the quantum dot sheet 130 and the prism sheet 140. The air layer 134 may be filled with air having a relatively small refractive index. The air layer 134 may increase a recycling efficiency of light passed through the second barrier film 133. Accordingly, the display apparatus 1 according to the embodiment of the disclosure may implement wide colors.

Referring to FIGS. 3 and 7, the prism sheet 140 may be disposed in front of the quantum dot sheet 130. The prism sheet 140 may refract and concentrate light emitted from the quantum dot sheet 130, thereby improving the luminance of the display apparatus 1. Particularly, light incident on the prism sheet 140 may pass through the first prism pattern 142 and the second prism pattern 144, and most of the light may be refracted and concentrated, and the rest of the light may be refracted and lost or reflected.

The prism sheet 140 may include a first prism base layer 141, a first prism pattern 142, a second prism base layer 143, a second prism pattern 144, and a third prism base layer 145.

The first prism pattern 142 may be positioned between the first prism base layer 141 and the second prism base layer 143. The second prism pattern 144 may be positioned between the second prism base layer 143 and the third prism base layer 145. The first prism pattern 142 and the second prism pattern 144 may have the same structure.

On the other hand, the first prism pattern 142 may be different from the second prism pattern 144. Particularly, the first prism pattern 142 may extend substantially in the Y-axis direction, and the second prism pattern 144 may extend in the X-axis direction substantially perpendicular to the Y-axis direction.

Referring to FIGS. 3 and 8, the reflective polarizing sheet 150 may be disposed in front of the prism sheet 140. The reflective polarizing sheet 150 may include a Dual Brightness Enhancement Film (DBEF) 151 and a condensing prism pattern 152.

The DBEF 151 may transmit one polarized light beam and reflect another polarized light beam, thereby improving the luminance. That is, the light beam reflected from the DBEF 151 may be recycled inside the display apparatus 1, thereby improving the luminance of the display apparatus 1. Particularly, some of the light beams reflected by the DBEF 151 may be reflected back to the DBEF 151 by the reflector sheet 90. As this process is repeated, a polarization direction of light may be changed, and in response to the polarization direction of light being parallel to a polarization direction of the DBEF 151, the light may pass through the DBEF 151.

The condensing prism pattern 152 may improve the luminance by concentrating light. The condensing prism pattern 152 may be a pattern in which ridges and valleys are repeated. The condensing prism pattern 152 may be formed by arranging a plurality of prisms having substantially triangular cross-sections to be adjacent to each other. An apex angle of the prism may be formed to be 90° or more. The apex angle of the prism may be an obtuse angle.

Accordingly, a condensing efficiency of the condensing prism pattern 152 may be increased. As the change in the luminance of the display apparatus 1 is reduced by the condensing prism pattern 152, the contrast ratio may be improved.

Figure 9:
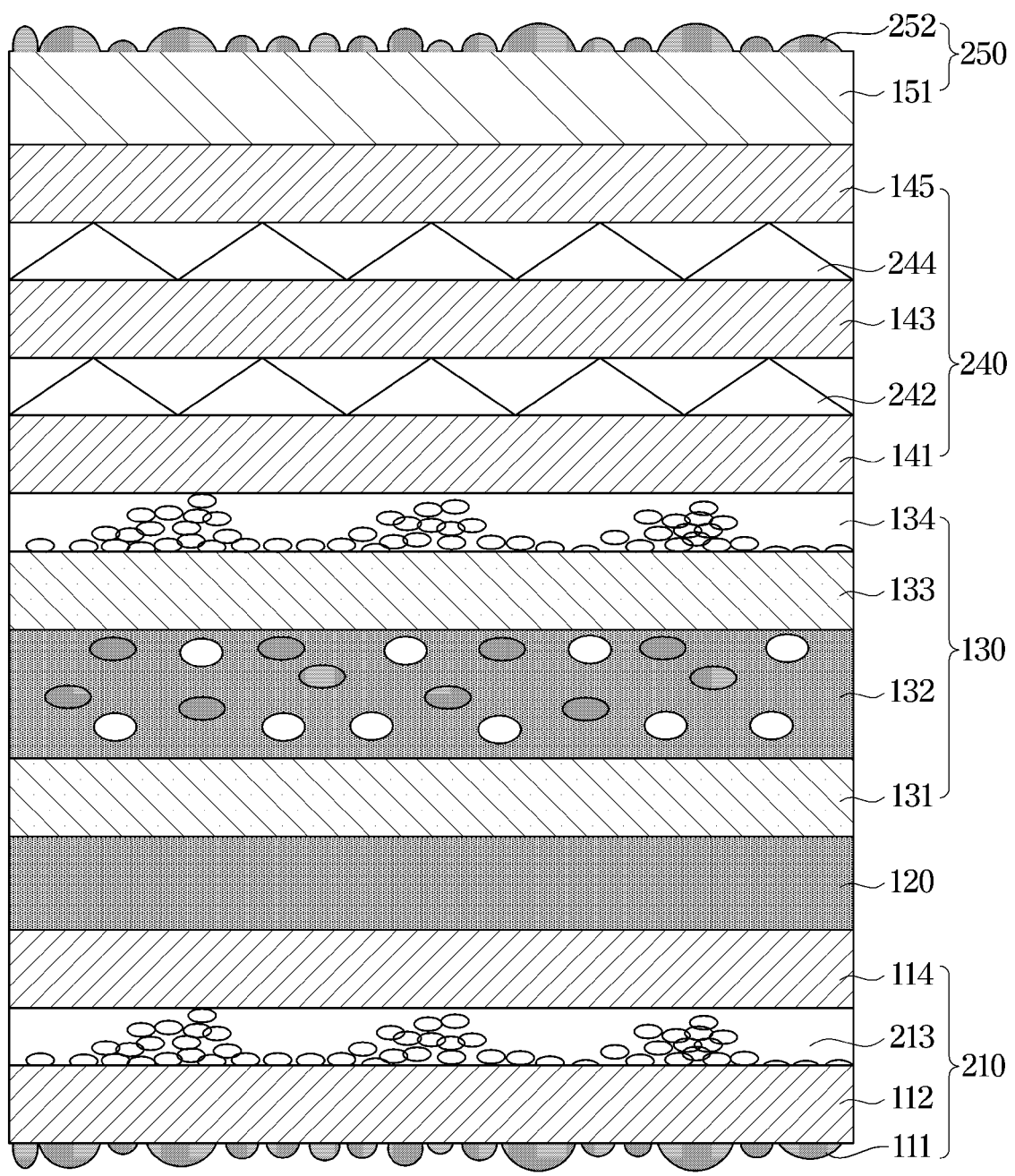
FIG. 9 is a view schematically illustrating a cross section of an optical member according to another embodiment of the disclosure.

FIG. 9 is a view schematically illustrating a cross section of an optical member according to another embodiment of the disclosure.

An optical member 200 according to another embodiment of the disclosure will be described with reference to FIG. 9. For the same configuration as in the embodiment illustrated in FIG. 3, the same reference numerals are assigned, and detailed descriptions may be omitted.

Referring to FIG. 9, a diffuser sheet 210 of the optical member 200 according to another embodiment of the disclosure may include a diffusion pattern 213.

The diffusion pattern 213 may be formed by stacking beads from a first diffusion base layer 112. Although not shown, the diffusion pattern 213 may be formed by a protrusion extending from the first diffusion base layer 112. The diffusion pattern 213 may be formed by a configuration configured to secure a space between the first diffusion base layer 112 and a second diffusion base layer 114. The diffusion pattern 213 may be defined as a space formed between the first diffusion base layer 112 and the second diffusion base layer 114.

The diffusion pattern 213 including the above-mentioned configuration may shield and/or diffuse light by changing a path of light passed through a diffusion bead 111. Due to this configuration, the diffusion pattern 213 according to the another embodiment of the disclosure may have improved shielding and diffusion performance compared to the diffusion prism pattern 113 illustrated in FIG. 3.

A reflective polarizing sheet 250 of the optical member 200 according to the another embodiment of the disclosure may include a protective bead 252.

The protective bead 252 may diffuse light passed through a Dual Brightness Enhancement Film (DBEF) 151. The protective bead 252 may have an irregular shape to evenly mix light. As the protective bead 252 is positioned at the foremost of the optical member 200, the protective bead 252 may protect the optical member 200.

A first prism pattern 242 of the optical member 200 according to the another embodiment of the disclosure may be different from a second prism pattern 244 because the protective bead 252 is provided as a part of the reflective polarizing sheet 250. Particularly, unlike the embodiment shown in FIG. 3, the first prism pattern 242 may extend in approximately the X-axis direction, and the second prism pattern 244 may extend in the Y-axis direction approximately perpendicular to the X-axis direction. Due to this configuration, the optical member 200 according to the another embodiment of the disclosure may maintain condensing performance similar to that of the optical member 100 shown in FIG. 3 even though the protective bead 252 is provided at the foremost.

That is, in the optical member 200 according to the another embodiment of the disclosure, the condensing efficiency may be improved because the first prism pattern 242 and the second prism pattern 244 of the prism sheet 240 extend in approximately vertical directions, respectively. Therefore, although the protective bead 252 is provided, the condensing efficiency may be secured.

As is apparent from the above description, the display apparatus may reduce the width of the bezel because the display apparatus includes the deformation preventing layer.

The display apparatus may have improved productivity because the optical member is formed integrally.

The display apparatus may reduce the width thereof because the optical member is formed integrally.

The display apparatus may secure rigidity because the optical member is formed integrally.

The display apparatus may improve the contrast ratio because the condensing prism pattern is arranged in front of the Dual Brightness Enhancement Film of the optical member.

The display apparatus may increase a recycling efficiency of light emitted from the quantum dot sheet because the display apparatus includes the air layer.

Although a few example embodiments of the disclosure have been shown and described, it would be appreciated by those skilled in the art that changes may be made in these embodiments without departing from the principles and spirit of the disclosure.

What is claimed is:

1. A display apparatus comprising:
  a liquid crystal panel;
  a light source configured to provide light to the liquid crystal panel; and
  an optical member disposed between the liquid crystal panel and the light source,
  wherein the optical member comprises:
    a diffuser sheet that is configured to diffuse the light from the light source; and
    a deformation preventing layer comprising a first material having a lower expansion or contraction rate than the diffuser sheet,
  wherein the diffuser sheet comprises:
    a diffusion bead that is configured to diffuse incident light;
    a first diffusion base layer;
    a diffusion prism pattern that is configured to change a path of light that passed through the diffusion bead, or a diffusion pattern that is formed of stacked beads and is configured to shield or diffuse the light that passed through the diffusion bead; and
    a second diffusion base layer, and
  wherein the second diffusion base layer is formed directly on, in a direction towards the liquid crystal panel, the diffusion prism pattern or the diffusion pattern, the diffusion prism pattern or the diffusion pattern is formed directly on a first face of the first diffusion base layer that faces towards the liquid crystal panel, and the diffusion bead is formed directly on a second face of the first diffusion base layer that is opposite of the first face.

2. The display apparatus of claim 1, wherein the optical member further comprises a quantum dot sheet disposed on a first side of the deformation preventing layer that is opposite to a second side of the deformation preventing layer on which the diffuser sheet is disposed.

3. The display apparatus of claim 2, wherein
  the optical member further comprises a prism sheet disposed on a first side of the quantum dot sheet that is opposite to a second side of the quantum dot sheet on which the deformation preventing layer is disposed, and
  the quantum dot sheet comprises a quantum dot layer and an air layer, the air layer formed of stacked beads and formed on a side of the quantum dot layer that faces the prism sheet.

4. The display apparatus of claim 2, wherein
the first material of the deformation preventing layer has a lower coefficient of thermal expansion than the diffuser sheet and the quantum dot sheet, or the deformation preventing layer further comprises a second material having a lower coefficient of thermal expansion than the diffuser sheet and the quantum dot sheet.

5. The display apparatus of claim 2, wherein
the deformation preventing layer is disposed in front of the diffuser sheet, and the quantum dot sheet is disposed in front of the deformation preventing layer.

6. The display apparatus of claim 1, wherein
the optical member further comprises a Dual Brightness Enhancement Film (DBEF) that is configured to transmit a portion of the light passing therethrough and to reflect another portion of the light passing therethrough; and
a condensing prism pattern formed directly on a face of the DBEF that faces towards the liquid crystal panel.

7. The display apparatus of claim 6, wherein
a cross section of the condensing prism pattern has an apex angle that is an obtuse angle.

8. The display apparatus of claim 1, wherein
the optical member is formed integrally.

9. The display apparatus of claim 1, wherein
the deformation preventing layer comprises a glass.

10. The display apparatus of claim 1, wherein
the diffuser sheet comprises the diffusion prism pattern that is configured to change the path of light that passed through the diffusion bead.

11. The display apparatus of claim 1, wherein
the first material of the deformation preventing layer has a higher light transmittance than the diffuser sheet, or the deformation preventing layer comprises a second material having a higher light transmittance than the diffuser sheet.

12. The display apparatus of claim 1, wherein
the first material of the deformation preventing layer has a lower light absorption rate than the diffuser sheet, or the deformation preventing layer further comprises a second material having a lower light absorption rate than the diffuser sheet.

13. The display apparatus of claim 1, wherein
the diffuser sheet comprises the diffusion pattern that is configured to shield or diffuse the light that passed through the diffusion bead.

14. The display apparatus of claim 2, wherein
the optical member further comprises:
    a Dual Brightness Enhancement Film (DBEF) that is configured to transmit a portion of the light passing therethrough and to reflect another portion of the light passing therethrough; and
    a protective bead formed on a side of the DBEF that faces the liquid crystal panel.

15. The display apparatus of claim 14, further comprising:
a prism sheet disposed between the quantum dot sheet and the DBEF,
wherein the prism sheet comprises:
    a first prism pattern extending in a first direction; and
    a second prism pattern extending in a second direction perpendicular to the first direction.

16. A display apparatus comprising:
a liquid crystal panel;
a light source configured to provide light to the liquid crystal panel; and
an optical member disposed between the liquid crystal panel and the light source,
wherein the optical member comprises:
    a diffuser sheet that is configured to diffuse the light from the light source;
    a quantum dot sheet that is configured to convert the light that is diffused by the diffuser sheet;
    a deformation preventing layer disposed between the diffuser sheet and the quantum dot sheet and comprising a first material having a lower coefficient of thermal expansion than the diffuser sheet or the quantum dot sheet;
    a Dual Brightness Enhancement Film (DBEF) disposed in front of the deformation preventing layer and provided to transmit a portion of the light passing therethrough and to reflect another portion of the light passing therethrough; and
    a condensing prism pattern formed directly on a face of the DBEF that faces the liquid crystal panel.

17. The display apparatus of claim 16, wherein
the optical member further comprises a prism sheet disposed between the quantum dot sheet and the DBEF, and
an air layer is formed between the quantum dot sheet and the prism sheet.

18. An optical member for a display apparatus, the optical member comprising:
a diffuser sheet that is configured to diffuse light from a light source;
a quantum dot sheet that is configured to convert the light that is diffused by the diffuser sheet;
a deformation preventing layer disposed between the diffuser sheet and the quantum dot sheet and comprising a first material having a lower coefficient of thermal expansion than the diffuser sheet or the quantum dot sheet;
a Dual Brightness Enhancement Film (DBEF) disposed in front of the deformation preventing layer and provided to transmit a portion of the light passing therethrough and to reflect another portion of the light passing therethrough; and
a condensing prism pattern formed directly on a face of the DBEF that faces away from the diffuser sheet.

19. The optical member of claim 18, wherein
the optical member further comprises a prism sheet disposed between the quantum dot sheet and the DBEF, and
an air layer is formed between the quantum dot sheet and the prism sheet.

20. The optical member of claim 18, wherein
the first material of the deformation preventing layer has a higher light transmittance and a lower light absorption than the diffuser sheet and the quantum dot sheet, or the deformation preventing layer further comprises a second material having a higher light transmittance and a lower light absorption than the diffuser sheet and the quantum dot sheet.

* * * * *